United States Patent
Breitfeld et al.

(10) Patent No.: US 6,644,635 B2
(45) Date of Patent: *Nov. 11, 2003

(54) HYDRAULICALLY DAMPING ELASTOMER BEARING

(75) Inventors: Thorsten Breitfeld, Boeblingen (DE); Klaus-Thomas Hettich, Karlsruhe (DE); Bernd Koeder, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/908,409

(22) Filed: Jul. 18, 2001

(65) Prior Publication Data

US 2002/0008342 A1 Jan. 24, 2002

(30) Foreign Application Priority Data

Jul. 19, 2000 (DE) .......................................... 100 35 025

(51) Int. Cl.[7] .............................. F16F 13/00; F16F 5/00; F16F 15/00; F16F 9/00
(52) U.S. Cl. .......................... 267/140.13; 267/140.12; 267/293; 267/219
(58) Field of Search ....................... 267/140.13, 140.12, 267/140.11, 219, 220, 122, 140.15, 140.14, 292, 293, 294; 248/562, 636, 638, 583; 416/134 A, 416; 180/300, 312, 9.2

(56) References Cited

U.S. PATENT DOCUMENTS

| | | | | |
|---|---|---|---|---|
| 3,642,268 A | * | 2/1972 | Hipsher | |
| 4,872,651 A | * | 10/1989 | Thorn | 267/140.12 |
| 5,024,425 A | * | 6/1991 | Schwerdt | |
| 5,096,166 A | * | 3/1992 | Schwerdt | |
| 5,172,893 A | * | 12/1992 | Bouhier et al. | |
| 5,178,376 A | * | 1/1993 | Hamaekers et al. | |
| 5,516,083 A | * | 5/1996 | Sprang et al. | 267/140.12 |
| 6,386,529 B2 | * | 5/2002 | Bik et al. | 267/219 |
| 6,527,261 B2 | * | 3/2003 | Breitfeld et al. | 267/140.12 |
| 2002/0079628 A1 | * | 6/2002 | Breitfeld et al. | 267/140.11 |

FOREIGN PATENT DOCUMENTS

| DE | 38 21 240 | | 1/1989 |
|---|---|---|---|
| GB | 2322427 | * | 8/1998 |

* cited by examiner

Primary Examiner—Douglas C. Butler
(74) Attorney, Agent, or Firm—Kenyon & Kenyon

(57) ABSTRACT

A hydraulically damping elastomeric bearing is suitable for mountings in a motor vehicle. The elastomeric bearing includes an elastic bearing part which is arranged between a sleeve-shaped outer part and an inner part coaxial thereto and which connects these elastically to one another. At least two chambers, which are filled with a liquid damping medium, communicate with one another via at least one throttle duct. Four chambers are provided, which are arranged in one plane, the four chambers each being arranged in one of four quadrants which are formed by two intersecting axes arranged in the plane, and at least two throttle ducts being provided.

25 Claims, 3 Drawing Sheets

HYDRAULICALLY DAMPING ELASTOMER BEARING

FIELD OF THE INVENTION

The present invention relates to a hydraulically damping elastomer bearing suitable for mountings in a motor vehicle.

BACKGROUND INFORMATION

German Published Patent Application No. 38 21 240 describes an elastomeric bearing, in which an elastic bearing part, for example, made of an elastic or elastomeric plastic or rubber, is arranged between a sleeve-shaped outer part and an inner part coaxial thereto. With the aid of this bearing part, an elastic connection between the outer sleeve and the inner part is made, which allows relative movements between the parts. The elastomeric bearing also has two chambers which are filled with a liquid damping medium and communicate with one another via a throttle duct. Elastomeric bearings of this type are used in order to mount a vibrating assembly on a non-vibrating holding device. The elastomeric bearings serve, in this context, for vibration insulation or vibration damping. For example, elastomeric bearings of this type are used in vehicle construction in order to mount vehicle axles, a transmission or an engine on the vehicle body. One of the parts is connected to the vibrating assembly, while the other part is coupled to the non-vibrating holding device. The vibrations of the assembly give rise to relative movements between the parts which reduce the volume of one chamber and simultaneously increase the volume of the other chamber. At the same time, the liquid damping medium is exchanged correspondingly between the chambers via the throttle duct. By virtue of the throttling action of the throttle duct, this arrangement results in a damping of the relative movements and therefore to a damping of the vibrations capable of being transmitted between the sleeves.

Due to the selected arrangement of the chambers, conventional elastomeric bearings include a working direction which depends on the application. Thus, a reduction in volume of one chamber, with a simultaneous increase in volume of the other chamber, is possible only for those relative movements between the parts which have a direction component extending parallel to the working direction. Accordingly, a conventional elastomeric bearing can damp hydraulically only those loads or vibrations which include a direction component extending parallel to the working direction. In some applications of such elastomeric bearings, particularly in vehicle construction, however, different loads with different loading directions may occur. For example, on a vehicle, propulsive forces and braking forces, impacts and wheel-load changes in different directions may act on the respective elastomeric bearing.

It is an object of the present invention to provide an elastomeric bearing in which a damping action may be achieved in a plurality of different directions and in which a compact construction is to be ensured for the elastomeric bearing.

SUMMARY

The above and other beneficial objects of the present invention are achieved by providing an elastomeric bearing as described herein.

According to one example embodiment of the present invention, an elastomeric bearing includes a plurality of chambers, which are coupled to one another via corresponding throttle ducts so as to ensure two intersecting directions of movement and so that a relative adjustment between the parts reduces the volume in at least one of the chambers and increases the volume in another chamber coupled thereto. Hydraulic vibration damping may thereby be achieved for all the directions of movement which extend in a plane spanned by the intersecting directions of movement or axes.

According to one example embodiment of the present invention, each chamber which is arranged on a first side of the first axis and on a first side of the second axis may communicate, via a first of the throttle ducts, with a second chamber which is arranged on the first side of the first axis and on a second side of the second axis and, via a second of the throttle ducts, with a chamber which is arranged on a second side of the first axis and on the first side of the second axis. It is possible, by virtue of this arrangement of the chambers and throttle ducts, that one of the same chamber may be compressed in the two directions of movement extending parallel to the axes. Furthermore, in such an example embodiment of the present invention, it is possible to equip the first throttle duct and the second throttle duct with different throttling resistances, so that the damping action in the direction of one axis follows a different characteristic curve from that in the direction of the other axis.

In connection with the present invention, the term "on this side" describes a position on one side, whereas the term "on that side" denotes a position on the other side.

According to another example embodiment of the present invention, one of the axes may extend coaxially to the parts of the elastomeric bearing. Axial loads on the elastomeric bearing are damped correspondingly.

The inner part may include a cover at each of its axial ends, each cover closing two of the chambers axially, and, moreover, each cover including a throttle duct which connects chambers assigned to the cover to one another. By these throttle ducts being integrated into the cover, a compact construction may be obtained for the elastomeric bearing. Moreover, these throttle ducts may be produced relatively simply.

The throttle duct of the cover may be formed by a groove, in the form of an arc of a circle, which is introduced on an axial inner face of the cover. This arrangement generates a streamlined duct shape and may also be implemented at relatively low outlay.

The cover may include, on its inner face, a disc which axially outwardly closes axially a groove in the cover and axially inwardly closes axially the chambers assigned to the cover, the disc including a first orifice, through which the groove communicates with one chamber, and includes a second orifice, through which the groove communicates with the other chamber. A simple construction is obtained, which also makes it possible to produce relatively long flow ducts in the cover. In particular, the throttling action may be set via the length of the flow duct.

The elastomeric bearing has a particularly compact construction when two of the chambers are formed in one axial half of the bearing part and are located diametrically opposite one another with respect to the inner part, while the other two chambers are formed in the other axial half of the bearing part and are located diametrically opposite one another with respect to the inner part. In this example embodiment of the present invention, the first axis of damped relative movements between the parts is oriented coaxially to the parts. The second axis of the relative adjustments, damped by the elastomeric bearing, between the parts is arranged perpendicularly to the first axis.

The inner part may include at least two throttle ducts which extend axially with respect to the inner part and of which one connects to one another the chambers arranged on one side of the inner part and the other connects to one another the chambers arranged on the other side of the inner part. The integration of these throttle ducts into the inner part may result in a compact construction of the elastomeric bearing. Furthermore, the inner part may consist of a considerably more rigid material, for example, metal, than, for example, the bearing part, so that high dimensional stability may be ensured for the throttle ducts accommodated therein.

In order to obtain relatively large duct lengths for the throttle ducts despite the compact form of construction, these throttle ducts are connected to the respectively associated chambers, e.g., in the region of the axial ends of the inner part. For this purpose, for example, the axial end faces of the inner part may have incorporated in them in each case two depressions, via which in each case one of the throttle ducts communicates with one chamber assigned to this end of the inner part. Alternatively or additionally, the inner part may have a cover at each of its axial ends, each cover closing two of the chambers axially, and each cover having, in its axial inner face, in each case two depressions, via which in each case one of the throttle ducts communicates with one chamber assigned to this end of the inner part. By virtue of this construction, these throttle ducts may extend essentially over the entire axial length of the inner part, while the elastomeric bearing has a relatively compact form of construction. The throttling action of the throttle ducts may be influenced over the length of the latter. Furthermore, especially long throttle ducts make it possible, in particular, to accommodate an absorber mass which, for example, is co-adjusted during a flow through the throttle duct, the mass inertia of the absorber mass producing an additional damping action.

The features mentioned above and those described below may be used not only in the combination specified but also in other combinations or alone, without departing from the scope of the present invention.

DETAILED DESCRIPTION

Figure 1:
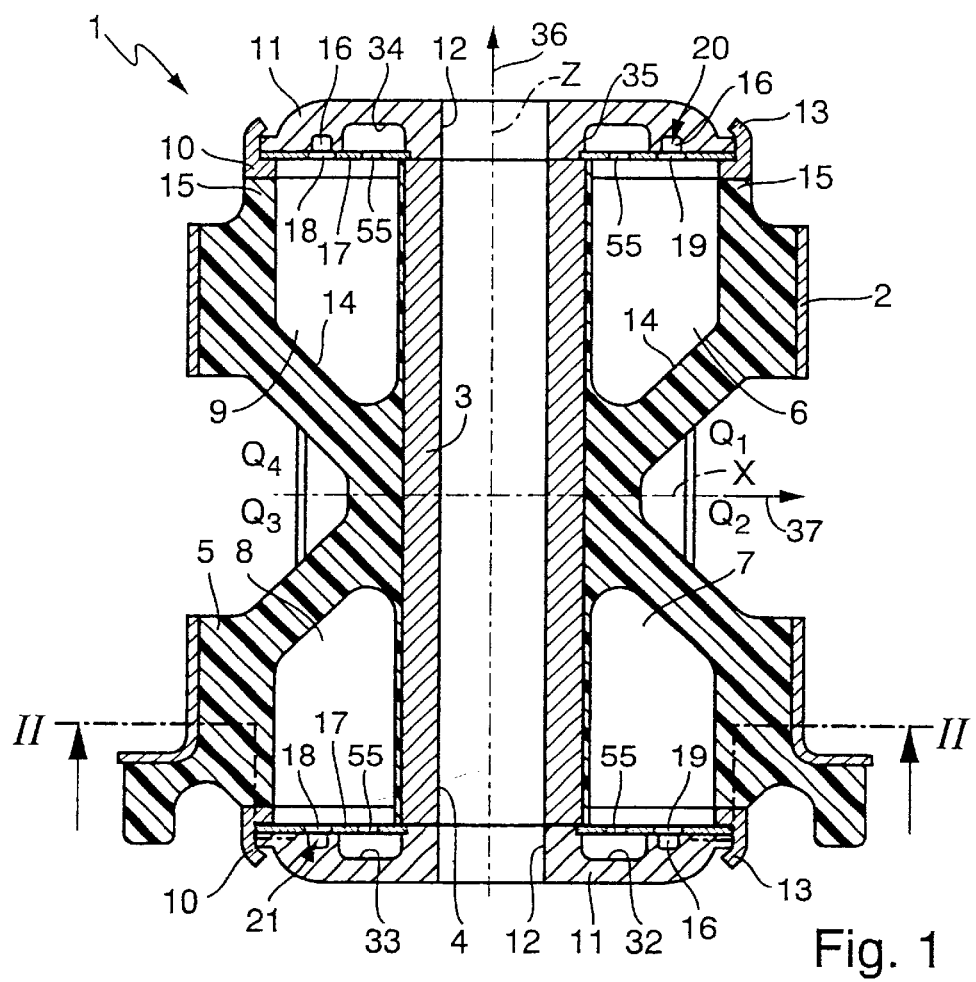
FIG. 1 is a schematic longitudinal cross-sectional view of an example embodiment of an elastomeric bearing according to the present invention.

As illustrated in FIG. 1, an elastomeric bearing 1 according to the present invention includes a sleeve-shaped outer part 2 and, coaxially to the outer part 2, an inner part 3 having an axial central passage orifice 4. Arranged radially between the outer part 2 and the inner part 3 is an elastic or elastomeric bearing part 5 which connects the two parts 2 and 3 elastically to one another. For example, the bearing part 5 may be vulcanized onto one of the parts or onto both parts 2, 3. Furthermore, the elastomeric bearing 1 includes four chambers 6, 7, 8 and 9 which are filled with a liquid damping medium. In the example embodiment of the present invention illustrated, to form the chambers 6 to 9 in each axial half of the bearing part 5, corresponding recesses are cut out in an axially outer region of the bearing part 5, so that the chambers 6 to 9 are delimited radially inwardly and radially outwardly and also axially inwardly by elastic wall material of the bearing part 5.

As illustrated in FIG. 1, the four chambers 6 to 9 are arranged in one plane, i.e., in the drawing plane or the sectional plane of FIG. 1. A system of coordinates including two axes perpendicular to one another, which are designated by X and Z, extend in this plane. The Z-axis is arranged coaxially and concentrically to the parts 2 and 3. The two axes X and Z form four quadrants Q1, Q2, Q3 and Q4 in the XZ plane. One of the chambers 6 to 9 is arranged in each of these quadrants Q1 to Q4. In the example embodiment of the present invention illustrated, the chambers 6 to 9 are arranged mirror-symmetrically both with respect to the Z-axis and with respect to the X-axis. The axes X and Z may also intersect at an angle different from 90°.

As further illustrated in FIG. 1, a ring 10 of L-shaped cross-section is attached, e.g., vulcanized, onto each of the axial ends of the bearing part 5. Disc-shaped covers 11 are fastened to the axial ends of the inner part 3, each of these covers 11 having a central orifice 12 which is in alignment with the passage orifice 4 of the inner part 3. The covers 11 are inserted into one of the rings 10 and fastened thereto by an axially projecting collar 13 of the ring 10 being bent and positively engaged over.

Each cover 11 is thus assigned to one half of the bearing part 5 and correspondingly closes axially outwardly the chambers 6, 9 and 7, 8 assigned to this half of the bearing part 5.

With regard to the shaping of the chambers 6 to 9, in an axially inner portion, the chambers 6 to 9 are configured in longitudinal section, as illustrated in FIG. 1, so that they taper triangularly axially inwardly. The cross-section remains substantially constant axially outwardly. In the event of a relative adjustment between the outer part 2 in relation to the inner part 3, during which, for example, the inner part 3 moves upwardly as illustrated in FIG. 1, the radially inner wall of the upper chambers 6 to 9 is adjusted upwardly and at the same time takes up the axially inner end of the chamber 6 or 9. As a result, a radially outer wall region 14 of the axially inner end of the chambers 6, 9 is adjusted out of the initial position illustrated in FIG. 1, in which the wall region 14 is inclined at approximately 45° to the Z-axis, in the direction of a level position in which the wall region 14 extends approximately parallel to the X-axis. A radially and axially outer wall portion 15 of the bearing part 5 is simultaneously adjusted axially outwardly by virtue of being coupled to the ring 10. At the same time, the increase in volume of the upper chambers 6 and 9 in their axially outer region is markedly greater than, e.g., approximately twice as great as, the decrease in volume in the axially inner region. A corresponding change in volume occurs in a similar manner in the lower chambers 7 and 8.

Figure 2:
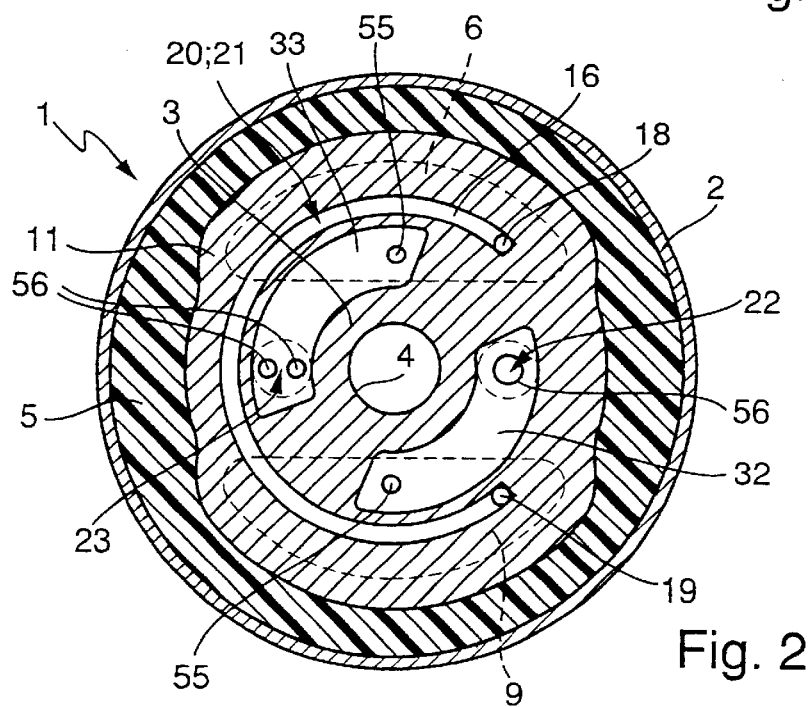
FIG. 2 is a schematic cross-sectional view of the elastomeric bearing illustrated in FIG. 1 taken along the line II—II.

In each cover 11, a groove 16, which as illustrated in FIG. 2 extends in the form of a segment of an annulus, is incorporated in an end face facing the chambers 6 to 9. This groove 16 is closed by a disc 17 which is attached to the cover 11 on the inner face thereof. This disc 17 thus closes the groove 16 axially outwardly and the respectively associated chambers 6, 9 and 7, 8 axially inwardly. In the regions of the ends of the groove 16, this disc 17 includes an orifice 18 and 19, via which the groove may communicate with the respectively associated chambers 6, 9 and 7, 8. Accordingly, the groove 16 assigned to the chambers 6 and 9 illustrated at the top in FIG. 1 forms a first throttle duct 20, via which the two chambers 6 and 9 may communicate with one another. In contrast, the grooves 16 assigned to the chambers 7 and 8 illustrated at the bottom in FIG. 1 forms a second throttle duct 21, via which the lower chambers 7 and 8 may communicate with one another.

Figure 3:
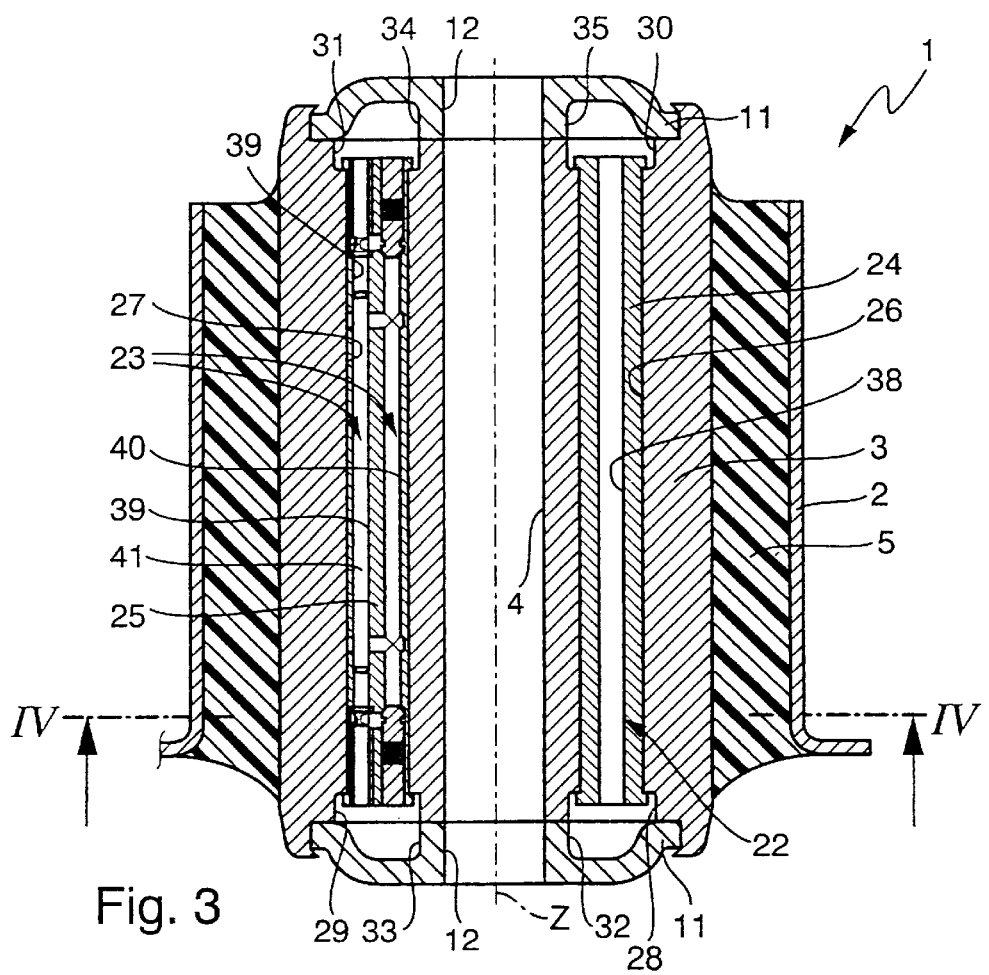
FIG. 3 is a schematic longitudinal cross-sectional view of another example embodiment of an elastomeric bearing according to the present invention.
Figure 4:
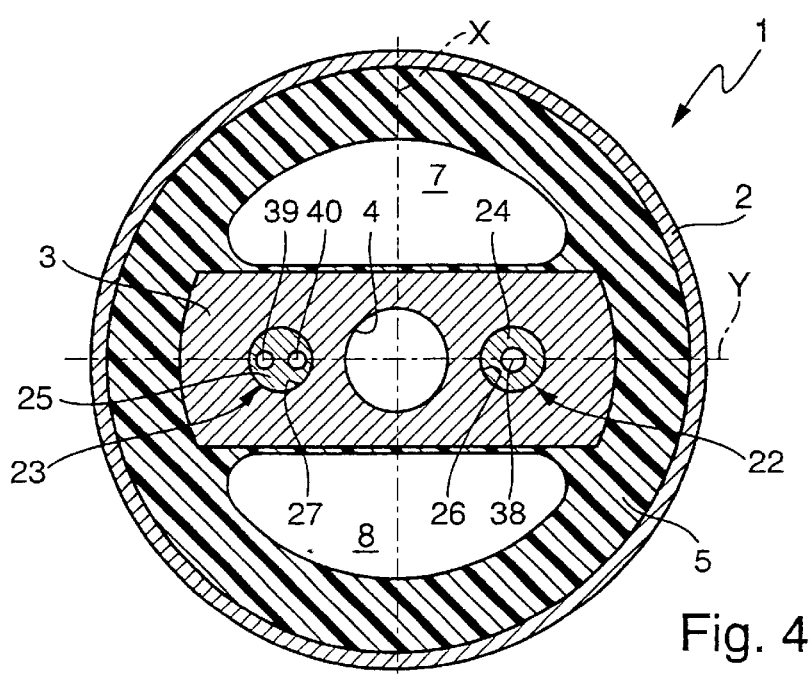
FIG. 4 is a schematic cross-sectional view of the elastomeric bearing illustrated in FIG. 3 taken along the line IV—IV.

As illustrated in FIGS. 2, 3 and 4, two further throttle ducts, i.e., a third throttle duct 22 and a fourth throttle duct 23, are formed in the inner part 3. These throttle ducts 22 and 23 extend parallel to the longitudinal axis Z of the inner part 3. The ducts 22 and 23 are formed in an insertion part 24 and 25 which is inserted into a corresponding insertion orifice 26 and 27, corresponding insertion orifices 26 and 27 being formed in the inner part 3.

Each of these throttle ducts 22 and 23 connects one of the chambers 6 to 9 of one half of the bearing part 5 to one of the chambers 6 to 9 of the other half of the bearing part 5. For example, the third throttle duct 23 connects to one another the chambers 6 and 7 illustrated on the right in FIG. 1, whereas the fourth throttle duct 23 connects to one another the chambers 8 and 9 illustrated on the left in FIG. 1.

The arrangement of the four chambers 6 to 9 and the coupling of these by the four throttle ducts 20 to 23 may therefore be described as follows: The chamber 6 of the first quadrant Q1 is connected via the first throttle duct 20 to the chamber 9 of the fourth quadrant Q4 and via the third throttle duct 22 to the chamber 7 of the second quadrant Q2. The chamber 7 of the second quadrant Q2 is connected via the third throttle duct 22 to the chamber 6 of the first quadrant Q1 and via the second throttle duct 21 to the chamber 8 of the third quadrant Q3. Moreover, the chamber 8 of the third quadrant Q3 is coupled via the second throttle duct 21 to the chamber 7 of the second quadrant Q2 and via the fourth throttle duct 23 to the chamber 9 of the fourth quadrant Q4. Finally, the chamber 9 of the fourth quadrant Q4 is connected via the fourth throttle duct 23 to the chamber 8 of the third quadrant Q3 and via the first throttle duct 20 to the chamber 6 of the first quadrant Q1.

Therefore, each of the four chambers 6 to 9 which is arranged on a first side of the X-axis is connected to a chamber 6 to 9 which is arranged on a second side of the X-axis, and, moreover, each of the chambers 6 to 9 which is arranged on a first side of the Z-axis is connected to a chamber 6 to 9 which is arranged on a second side of the Z-axis. Furthermore, each chamber 6 to 9 which is arranged on the first side of the X-axis and on the first side of the Z-axis is also connected, via one of the throttle ducts 20 to 23, to another chamber 6 to 9 which is arranged on the first side of the X-axis and on the second side of the Z-axis and is connected, via another of the throttle ducts 20 to 23, to a further chamber 6 to 9 which is arranged on the second side of the X-axis and on the first side of the Z-axis.

In order to couple the third throttle duct 22 and the fourth throttle duct 23 to the respectively associated chambers 6, 7 and 8, 9, two axial depressions 28, 29 and 30 and 31 are cut out in the axial end faces of the inner part 3. Moreover, in the example embodiment of the present invention illustrated in FIGS. 2 and 3, axial depressions 32, 33 and 34, 35 are likewise formed on the axially inner inner face of the cover 11 and may be arranged congruently to the abovementioned depressions 28 to 31 of the inner part 3. For example, the depressions 28 and 32 connect the third throttle duct 22 to the chamber 7 of the second quadrant Q2, whereas the depressions 30 and 35 couple the third throttle duct 22 to the chamber 6 of the first quadrant Q1. Correspondingly, the depressions 29 and 33 connect the fourth throttle duct 23 to the chamber 8 of the third quadrant Q3, whereas the depressions 31 and 34 couple the fourth throttle duct 23 to the chamber 9 of the fourth quadrant Q4.

The elastomeric bearing 1 illustrated in FIG. 1 operates as follows:

In the event of a load parallel to the Z-axis, which is indicated by an arrow 36, for example, the inner part 3 is adjusted upwardly in relation to the outer part 2. The volumes in the chambers 7 and 8 are reduced, and, simultaneously, the volumes of the chambers 6 and 9 are increased. Damping medium may flow from the chamber 7 over into the chamber 6 via the third throttle duct 22, and damping medium flows from the chamber 8 over into the chamber 9 via the fourth throttle duct 23. By virtue of the configuration of the throttle ducts 22 and 23, the exchange of damping medium occurs in a correspondingly throttled or damped manner, so that the adjusting movement between the inner part 3 and the outer part 2 is also damped correspondingly.

In the event of a load on the elastomeric bearing 1 parallel to the X-axis, which is indicated by an arrow 37, for example, the volumes of the chambers 6 and 7 are reduced, and, at the same time, the volumes of the chambers 8 and 9 increase. The exchange of damping medium then occurs via the first throttle duct 20 and via the second throttle duct 21. A transmission of force or transmission of movement between the two parts 2 and 3 occurs in a correspondingly damped manner as a function of the throttling action of the throttle ducts 20 and 21. The two axial directions X and Z correspond to the main working directions of the elastomeric bearing 1. Relative adjustments which have both components parallel to the Z-axis and components parallel to the X-axis are damped correspondingly. Thus, all forces which act on the elastomeric bearing 1 or relative movements which occur between the parts 2 and 3 are damped as soon as one of the associated direction components is in the XZ-plane.

The throttle ducts 22 and 23 active for achieving the damping action in the direction of the Z-axis may have different throttling resistances from the throttle ducts 20 and 21 active for achieving damping in the direction of the X-axis. A two-dimensional damping behavior of the elastomeric bearing 1 which is suitable for the respective application may be implemented in this manner.

In the example embodiment of the present invention illustrated in FIG. 3, in contrast to that illustrated in FIG. 1, there is no disc 17 (cf. FIG. 1) arranged axially between the cover 11 and the respectively associated axial end of the inner part 3 or of the bearing part 5.

In the example embodiment of the present invention illustrated in FIGS. 2, 3 and 4, the third throttle duct 22 is configured as a cylindrical orifice 38 which is introduced into the insertion part 24. In contrast, the fourth throttle duct 23 includes two part-ducts, i.e., a first part-duct 39 and a second part-duct 40, which connect the two associated chambers 8 and 9 to one another.

Figure 5:
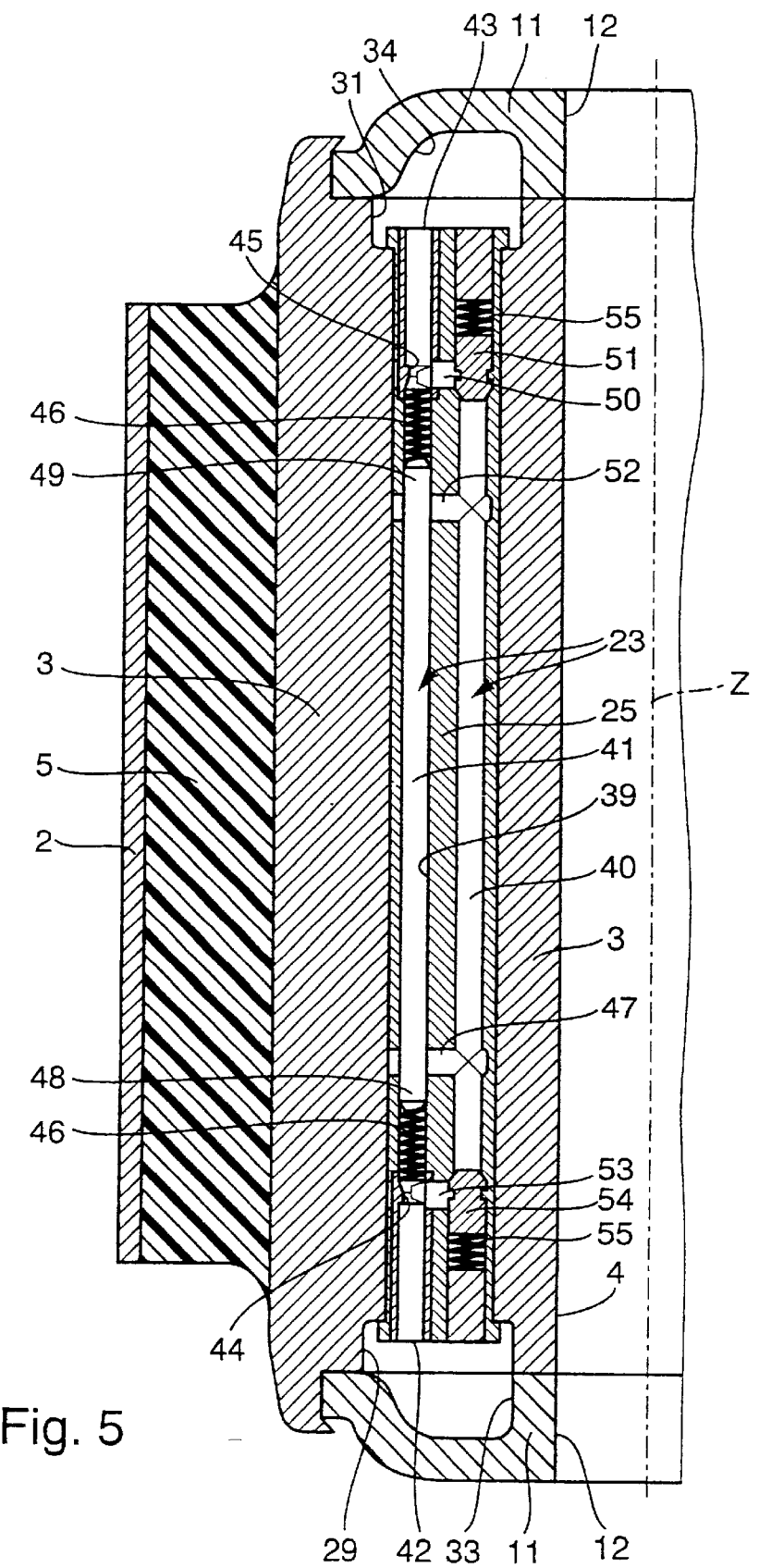
FIG. 5 is a schematic cross-sectional view of a further example embodiment of an elastomeric bearing according to the present invention.

As illustrated in FIGS. 3 and 5, these two part-ducts 39 and 40 are introduced into the insertion element 25 and are arranged parallel to one another therein.

The first part-duct 39 includes an absorber 41 in the form of a cylindrical bar. The outer cross-section of this absorber 41 corresponds approximately to the inner cross-section of the first part-duct 39, although sufficient radial play is provided for the absorber 41 to be adjustable relatively freely in the first part-duct 39. For example, the absorber 41 includes at least three webs, which are distributed symmetrically on the circumference, project radially outwardly therefrom and extend axially along the absorber 41 and which cause radial centering of the absorber 41 in the first part-duct 39. The first part-duct 39 issues in the depressions 29, 33 and 31, 34 at its axial ends 42 and 43 and thus communicates with the chambers 8 and 9 assigned to the fourth throttle duct 23. The absorber 41 is adjusted as a function of pressure differences which are formed between the chambers 8 and 9 in the event of loads on the elastomer bearing 1 and which act at axial ends 48 and 49 of the absorber 41. The absorber 41 may be configured so that an exchange of damping medium between the two chambers 8 and 9 may occur via the first part-duct 39 by the flow passing around the absorber 41. The absorber 41 may narrow the opening cross-section of the first part-duct 39 to an extent so that virtually no appreciable exchange of damping medium may occur through the first part-duct 39.

Limit stops 44 and 45 which limit the adjusting movements of the absorber 41 are formed in the first part-duct 39. As illustrated in FIG. 5, helical springs 46 are supported in the region of the stops 44 and 45, these helical springs centering the absorber 41 axially and prestressing it into an initial position which is illustrated in FIGS. 3 and 5.

The second part-duct 40 includes a first inlet orifice 47 which is connected to the first part-duct 39 in the region of the first axial end 48 of the absorber 41. This first axial end 48 is assigned to the lower chamber 8 (cf. FIG. 1) as illustrated in FIGS. 3 and 5. When the absorber 41 is in the initial position illustrated, the first axial end 48 or a corresponding axial end portion covers the first inlet orifice 47, with the result that the latter is closed.

The absorber 41 is adjusted due to pressure differences between the chambers 8 and 9 assigned to its axial ends 48 and 49. In the case of a sufficient excess pressure in the lower chamber 8 in relation to the upper chamber 9, therefore, the absorber 41 is adjusted upwardly and may free the first inlet orifice 47 to a greater or lesser extent. When the upper stop 45 is reached, the first inlet orifice 47 is opened completely.

Moreover, the second part-duct 40 includes a first outlet orifice 50 which is likewise connected to the first part-duct 39. However, the connection of the first outlet orifice 50 to the first part-duct 39 is made at a point which is located outside the range of adjustment of the absorber 41, so that the first outlet orifice 50 is not covered by the absorber 41 in any adjustment position of the absorber 41. The first outlet orifice 50 is located, approximately level with the upper stop 45. In the region of the first outlet orifice 50 is arranged a first non-return valve 51 which is also designed as a pressure-regulating valve. This first non-return valve 51 or pressure-regulating valve 51 blocks a flow through the second part-duct 40 from its first outlet orifice 50 to its first inlet orifice 47. In the case of a sufficient excess pressure in the first inlet orifice 47 in relation to the first outlet orifice 50, the first valve 51 opens and allows a flow through the second part-duct 40 from its first inlet orifice 47 to its first outlet orifice 50.

Correspondingly, the second part-duct 40 includes a second inlet orifice 52, a second outlet orifice 53 and a second non-return valve 54. The second inlet orifice 52 is connected to the first part-duct 39 in the region of the second axial end 49 of the absorber 41, the second axial end 49 or a corresponding axial end portion overlapping and thus closing the second inlet orifice 52 when the absorber 41 is in the initial position illustrated. The second inlet orifice 52 is closed to a greater or lesser extent and thus controlled by the absorber 41 as a function of the adjusting movements of the absorber 41.

The second outlet orifice 53 likewise issues into the first part-duct 39, approximately level with the lower stop 44, outside the range of adjustment of the absorber 41. The second non-return valve 54 is also designed as an excess-pressure valve which allows a flow through the second part-duct 40 from the second inlet orifice 52 to the second outlet orifice 53 only in the case of a sufficient excess pressure in the second inlet orifice 52 in relation to the second outlet orifice 53. A reversed throughflow from the second outlet orifice 53 to the second inlet orifice 52 is blocked by the second non-return valve 54.

The non-return function or the excess-pressure regulating function of the valves 51 and 54 is achieved, for example, by a spring device 55 which prestresses the respective valve 51 or 54 into its closing position.

The fourth throttle duct 23 illustrated in FIGS. 3 and 5 operates as follow:

In the event of a load on the elastomeric bearing 1 parallel to its longitudinal axis Z, for example, a relative adjustment between the inner part 3 and the outer part 2 may occur, during which the inner part 3 moves upwardly in relation to the outer part 2 as illustrated in FIG. 5. The volume of the lower chamber 8 is correspondingly reduced, whereas the volume of the upper chamber 9 is increased. The damping medium in the lower chamber 8 is thereby compressed, and the pressure rises. The damping medium or the excess pressure arrives via the depressions 39 and 33 at the axial end of the first part-duct 39, so that the excess pressure of the lower chamber 8 prevails both at the second outlet orifice 53 and at the absorber 41. The absorber 41 is adjusted upwardly counter to the upper spring 46. In the case of relatively small pressure differences, i.e., in the case of smaller adjusting movements of the absorber 41, the inlet orifices 47 and 52 of the second part-duct 40 remain closed. An exchange of damping medium between the chambers 8 and 9 does not occur when the absorber 41 closes relatively tightly. Due to the mass of the absorber 41, which must be co-adjusted during relative movements between the inner part 3 and outer part 2, there is a reinforcement of the damping effect of the elastomeric bearing 1.

When the pressure in the lower chamber 8 rises further, the absorber 41 may be adjusted as far as an upper stop 45. Then, at the latest, the first inlet orifice 47 of the second part-duct 40 is opened completely and the pressure of the lower chamber then also prevails at the first non-return valve 51. As soon as the excess pressure of the chamber 8 exceeds the regulating pressure of the first non-return valve 51, the latter opens and allows a flow through the second part-duct 40 from its first inlet orifice 47 to its first outlet orifice 50. The damping medium passes from the first outlet orifice 50 via the first part-duct 39 into the depressions 31 and 34 and from these into the upper chamber 9.

The elastomeric bearing 1 according to the present invention therefore operates by the absorber 41 in the case of relatively low loads, in which case only relatively small relative movements between the outer part 2 and inner part 3 are possible. In the event of relatively high loads, the second part-duct 40 is activated as a result of a sufficient adjustment of the absorber 41, so that a throttled exchange of damping medium between the chambers 8 and 9 connected to one another may occur. Under higher loads, greater relative adjustments between the inner part 3 and outer part 2 are also possible. With the aid of the configuration according to the present invention of this fourth throttle duct 23, the elastomeric bearing 1 may be configured for a specific load characteristic.

In the event of a reversed load on the elastomeric bearing 1, such that an excess pressure occurs in the upper chamber 9 in relation to the lower chamber 8, the fourth throttle duct 23 behaves in a correspondingly similar manner.

In the example embodiment illustrated in FIG. 1 which includes a disc 17, this disc 17 may axially close the depressions 32, 33, 34, 35 which are formed in the cover 11. The disc 17 includes two orifices 55 and 56 for each of these depressions 32 to 35, one orifice 55 communicating with the respectively associated chamber 6 or 9 or 7 or 8, whereas the other orifice 56 is connected to the throttle duct 22 or 23 assigned to this chamber 6 to 9.

In the example embodiment of the present invention illustrated, only the fourth throttle duct 23 includes two part-ducts 39 and 40, whereas the third throttle duct 22 is configured in a conventional manner. An example embodiment of the present invention may include both the third throttle duct 22 and the fourth throttle duct 23 configured in a conventional manner or are composed of two part-ducts 39 and 40.

What is claimed is:

1. A hydraulically damping elastomeric bearing for a mounting in a motor vehicle, comprising
   a sleeve-shaped outer part;
   an inner part arranged coaxially to the outer part;
   an elastic bearing part arranged between the outer part and the inner part and elastically connecting the outer part and the inner part;
   four chambers filled with a liquid damping medium, the four chambers being arranged in one plane, each one of said chambers being arranged in a respective one of four quadrants formed between a first axis and a second axis arranged in the plane and intersecting; and
   at least two throttle ducts;
   wherein, via the at least two throttle ducts, at least one chamber disposed on a first side of the first axis communicates with at least one chamber disposed on a second side of the first axis and at least one chamber disposed on a first side of the second axis communicates with at least one chamber disposed on a second side of the second axis.

2. The elastomeric bearing according to claim 1, wherein the chamber disposed on the first side of the first axis and the first side of the second axis communicates via a first throttle duct with the chamber disposed on the first side of the first axis and the second side of the second axis and communicates via a second throttle duct with the chamber disposed on the second side of the first axis and the first side of the second axis.

3. The elastomeric bearing according to claim 1, wherein the first axis and the second axis are perpendicular.

4. The elastomeric bearing according to claim 1, wherein the four chambers are arranged mirror-symmetrically with respect to at least one of the first axis and the second axis.

5. The elastomeric bearing according to claim 1, wherein one of the first axis and the second axis is arranged coaxially to the outer part and the inner part.

6. The elastomeric bearing according to claim 1, wherein a first two of the four chambers are formed in a first axial half of the bearing part and are located diametrically opposite to one another with respect to the inner part and wherein a second two of the four chambers are formed in a second axial half of the bearing part and are located diametrically opposite to one another with respect to the inner part.

7. The elastomeric bearing according to claim 6, wherein the inner part includes at least two throttle ducts extending axially with respect to the inner part, one of the throttle ducts connecting to another chamber disposed on one side of the inner part and the other one of the throttle ducts connecting to another chamber disposed on the other side of the inner part.

8. The elastomeric bearing according to claim 7, wherein each axial end face of the inner part includes two depressions, each of the throttle ducts communicating with the respective chamber connected to each of the throttle ducts via the depressions.

9. The elastomeric bearing according to claim 7, wherein the inner part includes a cover at each axial end, each cover axially closing two chambers, each cover including, in an axial inner face, two depressions, the at least two throttle ducts communicating with the respective chamber via the depressions.

10. The elastomeric bearing according to claim 9, wherein the cover, on an inner face of the cover, includes a disc, the disc axially outwardly closing the depressions and axially inwardly closing the respective chambers, the disc including two orifices corresponding to each depression, the depressions communicating via the respective orifices with the respective chamber and throttle duct.

11. The elastomeric bearing according to claim 7, wherein at least one of the throttle ducts includes two part-ducts connecting two corresponding chambers, a first part-duct including an absorber adjusted as a function of pressure differences between the two corresponding chambers in the first part-duct, the absorber being configured to control an opening cross-section of a second part-duct as a function of an adjusting movement.

12. The elastomeric bearing according to claim 11, wherein the second part-duct includes a first inlet orifice corresponding to one chamber and a first outlet orifice corresponding to the other chamber, the first inlet orifice being connected to the first part-duct and being controlled by the absorber.

13. The elastomeric bearing according to claim 12, wherein the second part-duct includes a second inlet orifice corresponding to the other chamber and a second outlet orifice corresponding to the one chamber;
   wherein the second inlet orifice is connected to the first part-duct and is controlled by the absorber;
   wherein the absorber is configured to maintain the first inlet orifice open and the second inlet orifice closed in response to a sufficient excess pressure in the one chamber and to maintain the first inlet orifice closed and the second inlet orifice open in response to a sufficient excess pressure in the other chamber;
   wherein the first outlet orifice includes a first non-return valve configured to block a flow through the second part-duct from the first outlet orifice to the first inlet orifice and to allow a flow from the first inlet orifice to the first outlet orifice; and
   wherein the second outlet orifice includes a second non-return valve configured to block a flow through the second part-duct from the second outlet orifice to the second inlet orifice and to allow a flow from the second inlet orifice to the second outlet orifice.

14. The elastomeric bearing according to claim 13, wherein at least one of the first non-return valve and the second non-return valve is configured as an excess-pressure valve and is configured to allow a flow through the second part-duct from the respective inlet orifice to the respective outlet orifice only when a predetermined excess pressure is exceeded on an inlet side.

15. The elastomeric bearing according to claim 13, wherein the second inlet orifice issues into the first part-duct within a range of adjustment of a second end portion of the absorber corresponding to the other chamber, a throughflow opening cross-section of the second inlet orifice being controlled in accordance with one of a greater and a lesser overlap by the second end portion.

16. The elastomeric bearing according to claim 13, wherein the absorber is configured to close the first inlet orifice and the second inlet orifice in an initial position.

17. The elastomeric bearing according to claim 16, wherein the absorber is configured to close at least one of the first inlet orifice and the second inlet orifice at least in response to a pressure equilibrium between the two chambers.

18. The elastomeric bearing according to claim 17, wherein the first outlet orifice is connected to the first part-duct, the first outlet orifice issuing into the first part-duct outside a range of adjustment of a second end portion of the absorber corresponding to the other chamber.

19. The elastomeric bearing according to claim 18, wherein the second outlet orifice is connected to the first part-duct, the second outlet orifice issuing into the first part-duct outside a range of adjustment of a first end portion of the absorber corresponding to the one chamber.

20. The elastomeric bearing according to claim 12, wherein the first inlet orifice issues into the first part-duct within a range of adjustment of a first end portion of the absorber corresponding to one chamber, a throughflow opening cross-section of the first inlet orifice being controlled in accordance with one of greater and a lesser overlap by the first end portion.

21. The elastomeric bearing according to claim 11, wherein the absorber is prestressed into an initial position by a spring device.

22. The elastomeric bearing according to claim 1, wherein the inner part includes a cover at each axial end, each cover axially closing two of the chambers, each cover including a throttle duct connecting the respective chambers to one another.

23. The elastomeric bearing according to claim 22, wherein the throttle duct of the cover includes a groove in the form of an arc of a circle disposed on an axial inner face of the cover.

24. The elastomeric bearing according to claim 22, wherein each cover includes, on an inner face, a disc, the disc axially outwardly closing the respective throttle duct of each cover and axially inwardly closing a respective chamber, the disc including a first orifice and a second orifice, the respective throttle duct of each cover communicating with one chamber via the first orifice and the throttle duct communicating with the other chamber via the second orifice.

25. The elastomeric bearing according to claim 24, wherein each cover includes, in an axial inner face, two depressions, the at least two throttle ducts communicating with the respective chamber via the depressions, and wherein a common disc axially closes the at least two throttle ducts and the depressions.

* * * * *